(12) United States Patent
Sakamoto

(10) Patent No.: US 9,417,440 B2
(45) Date of Patent: Aug. 16, 2016

(54) ZOOM LENS AND IMAGE PICKUP APPARATUS HAVING THE SAME

(71) Applicant: CANON KABUSHIKI KAISHA, Tokyo (JP)

(72) Inventor: Masaru Sakamoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 14/618,339

(22) Filed: Feb. 10, 2015

(65) Prior Publication Data

US 2015/0234165 A1    Aug. 20, 2015

(30) Foreign Application Priority Data

Feb. 17, 2014 (JP) ................. 2014-027235

(51) Int. Cl.
*G02B 15/17* (2006.01)
*H04N 5/232* (2006.01)
*H04N 5/262* (2006.01)
*G02B 15/14* (2006.01)

(52) U.S. Cl.
CPC ............ *G02B 15/17* (2013.01); *H04N 5/23296* (2013.01); *G02B 15/14* (2013.01); *H04N 5/262* (2013.01)

(58) Field of Classification Search
CPC .... G02B 15/17; G02B 15/14; H04N 5/23296; H04N 5/262
USPC ........................................ 359/688; 348/240.3
See application file for complete search history.

(56) References Cited

U.S. PATENT DOCUMENTS

| 3,891,304 | A | * | 6/1975 | Muszumanski | ........ | G02B 15/17 359/683 |
| 4,239,339 | A | * | 12/1980 | Wagner | .................. | G02B 15/17 359/683 |
| 4,518,228 | A | * | 5/1985 | Sugiura | .................. | G02B 15/17 359/663 |
| 4,572,620 | A | * | 2/1986 | Kikuchi | ................. | G02B 15/17 359/688 |
| 4,634,237 | A | * | 1/1987 | Aono | ...................... | G02B 15/17 359/688 |

(Continued)

FOREIGN PATENT DOCUMENTS

JP    2011-039401 A    2/2011
JP    2011-107693 A    6/2011

*Primary Examiner* — Bumsuk Won
*Assistant Examiner* — Grant Gagnon
(74) *Attorney, Agent, or Firm* — Carter, DeLuca, Farrell & Schmidt, LLP

(57) ABSTRACT

A zoom lens comprising, in order from the object side to the image side, a first lens unit having a positive refractive power which does not move for zooming, a plurality of lens units which move during zooming, and a rear lens unit having a positive refractive power which does not move for zooming, wherein the refractive index, the Abbe constant, the partial dispersion ratio and the focal length of the positive lens located closest to the image side among the positive lenses in the first lens unit and the focal length of the first lens unit, the focal length of the positive lens located closest to the image side among the positive lenses in the first lens unit, and the focal length of the first lens unit are appropriately set.

8 Claims, 9 Drawing Sheets

(56) References Cited

U.S. PATENT DOCUMENTS

| | | | | |
|---|---|---|---|---|
| 4,832,471 A * | 5/1989 | Hamano | G02B 15/17 | 359/683 |
| 4,842,386 A * | 6/1989 | Kitagishi | G02B 15/173 | 359/654 |
| 4,948,239 A * | 8/1990 | Estelle | G02B 15/17 | 359/688 |
| 5,136,431 A * | 8/1992 | Terasawa | G02B 15/17 | 359/684 |
| 5,225,937 A * | 7/1993 | Horiuchi | G02B 15/17 | 359/676 |
| 5,579,172 A * | 11/1996 | Aoki | G02B 15/17 | 359/688 |
| 5,721,641 A * | 2/1998 | Aoki | G02B 27/646 | 359/554 |
| 5,757,554 A * | 5/1998 | Fukami | G02B 15/173 | 359/684 |
| 5,760,957 A * | 6/1998 | Suzuki | G02B 27/646 | 359/554 |
| 6,028,715 A * | 2/2000 | Takamoto | G02B 15/17 | 359/683 |
| 8,416,502 B2 * | 4/2013 | Takahashi | G03B 21/006 | 359/649 |
| 8,867,144 B2 * | 10/2014 | Yamanaka | G02B 15/17 | 359/683 |
| 2009/0290229 A1 * | 11/2009 | Kodaira | G02B 27/646 | 359/688 |
| 2009/0290230 A1 * | 11/2009 | Wakazono | G02B 27/646 | 359/688 |
| 2009/0296231 A1 * | 12/2009 | Shirasuna | G02B 15/173 | 359/687 |
| 2011/0037880 A1 * | 2/2011 | Sakamoto | G02B 15/17 | 348/240.3 |
| 2013/0208173 A1 * | 8/2013 | Takemoto | G02B 15/12 | 348/340 |
| 2014/0118607 A1 * | 5/2014 | Takemoto | G02B 15/177 | 348/345 |

* cited by examiner

ZOOM LENS AND IMAGE PICKUP APPARATUS HAVING THE SAME

BACKGROUND OF THE INVENTION

1. Field of the Invention

The present invention relates to a zoom lens suitable for use in a television camera, video camera, photographic camera, and digital camera, and in particular most suitable use in, a broadcast camera, having excellently corrected chromatic aberration at the telephoto end, high performance, and high zoom ratio, small in size, and light in weight.

2. Description of the Related Art

There has been developed heretofore a zoom lens composed of four lens units including, in order from the object side to the image side, a first lens unit having a positive refractive power which does not move for zooming, a second lens unit having a negative refractive power for zooming, a third lens unit having a negative refractive power for correcting image plane variation with zooming, and a fourth lens unit having a positive refractive power which does not move for zooming. There has also been developed heretofore a zoom lens composed of five lens units including, in order from the object side to the image side, a first lens unit having a positive refractive power which does not move for zooming, a second lens unit having a negative refractive power for zooming, a third lens unit having a negative refractive power, a fourth lens unit having a positive or negative refractive power for correcting image plane variation with zooming, and a fifth lens unit having a positive refractive power which does not move for zooming.

Japanese Patent Application Laid-Open No 2011-39401 and Japanese Patent Application Laid-Open No. 2011-107693 disclose as numerical embodiments high-zoom-ratio zoom lenses having a zoom ratio between approximately 17 to 22 and an angle of field at the wide angle end between approximately 60 to 78 degrees. However, in the zoom lenses disclosed in Japanese Patent Application Laid-Open No. 2011-39401 and Japanese Patent Application Laid-Open No. 2011-107693, the image side positive lens in the first lens unit is not satisfactorily achromatized because the partial dispersion ratio of its glass material is low and its reflective power is relatively low.

SUMMARY OF THE INVENTION

The present invention provides a small and light-weight zoom lens that is excellently corrected in chromatic aberration a the telephoto end while having performance and high zoom ratio.

According to the present invention, there is provided a zoom lens comprising, in order from the object side to the image side, a first lens unit having a positive refractive power which does not move for zooming, a plurality lens units which move during zooming, and a rear lens unit which does not move for zooming, wherein the zoom lens satisfies the following conditions:

$0.6545 < \theta p + 0.002 \times \nu p < 0.6660$, $43.0 < \nu p < 57.0$, $2.210 < Np + 0.01 \times \nu p < 2.320$, $1.72 < Np < 1.80$, and $2.10 < |fp/f1| < 2.70$, where $Np$, $\nu p$, and $\theta p$ are the refractive index, the Abbe constant and the partial dispersion ratio of the positive lens located closest to the image side among the positive lenses in the first lens unit respectively, fp is the focal length of the positive lens located closest to the image side among the positive lenses in The first lens unit, and f1 is the focal length of the first lens unit. The Abbe constant $\nu$ and the partial dispersion ratio $\theta$ are expressed by the following equations respectively:

$\nu = (Nd-1)/(NF-NC)$, and $\theta = (Ng-NF)/(NF-NC)$, where Ng, NF, Nd, and NC are refractive indexes for the Fraunhofer g-line, F-line, d-line, and C-line respectively.

Further features of the present invention will become apparent from the following description of exemplary embodiments with reference to the attached drawings.

According to the present invention, the material and the focal length of a positive lens(es) in the first lens unit can be selected appropriately, and there can be provided a zoom lens with excellently corrected chromatic aberration at the telephoto end, having high performance and high zoom ratio, small in size, and light in weight.

DESCRIPTION OF THE EMBODIMENTS

Figure 1A:
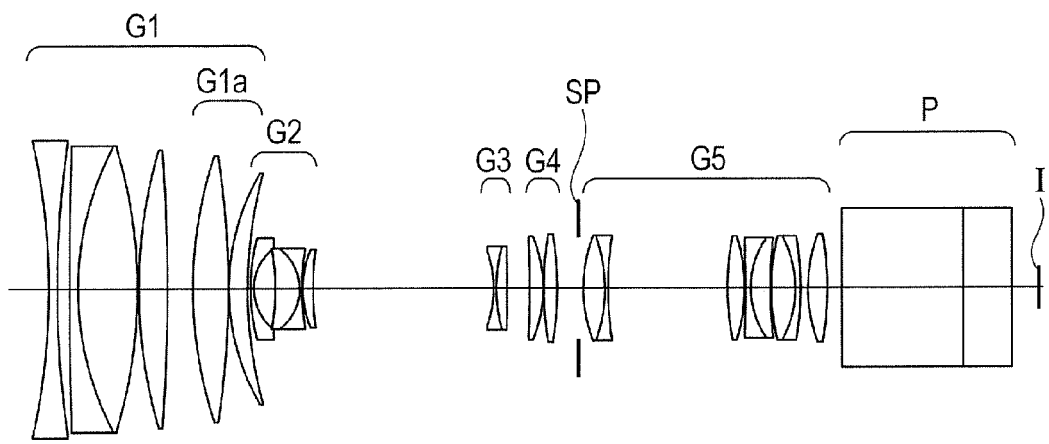
FIG. 1A is a cross sectional view of a zoom lens according to a first numerical embodiment at the wide angle end.

Preferred embodiments of the present invention will now be described in detail in accordance with the accompanying drawings.

In the following, embodiments of the zoom lens and the image pickup apparatus having the same according to the present invention will be described.

A characterizing features of the zoom lens according to the present Invention is specifying the refractive index, dispersion characteristics, and partial dispersion ratio of the positive lens located closest to the image side among the positive lenses in the first lens unit and the ratio of the refractive power of this positive lens and the refractive power of the first lens unit. With this feature, excellent correction of chromatic aberration at the telephoto end and reduction in the overall size of the zoom lens can be both achieved.

A zoom lens according to the present invention includes, in order from the object side to the image side, a first lens unit having a positive refractive power which does not move for zooming (changing magnification), a plurality of lens units which move during zooming, and a rear lens unit having a positive refractive power which does not move for zooming.

The positive lens located closest to the image side among the positive lenses in the first lens unit satisfies the following conditions (1), (2), (3), and (4):

$$0.6545 < \theta p + 0.002 \times \nu p < 0.6660 \quad (1)$$

$$43.0 < \nu p < 57.0 \quad (2)$$

$$2.210 < Np + 0.01 \times \nu p < 2.320 \quad (3)$$

$$1.72 < Np < 1.80 \quad (4)$$

where Np is the refractive index of the aforementioned positive lens, νp is the Abbe constant of the aforementioned positive lens, and θp is the partial dispersion ratio of the aforementioned positive lens.

Moreover, the aforementioned positive lens satisfies the following condition (5):

$$2.10 < |fp/f1| < 2.70 \quad (5),$$

where fp is the focal length of the aforementioned positive lens, and f1 is the focal length of the first lens unit.

The Abbe constant ν and the partial dispersion ratio θ are defined as follows:

$$\nu = (Nd-1)/(NF-NC) \quad (6)$$

$$\theta = (Ng-NF)/(NF-NC) \quad (7)$$

where Ng is the refractive index for the g-line, NP is the refractive index for the F-line, Nd is the refractive index for the d-line, and NC is the refractive index for the C-line.

The zoom lens according to the present invention having the above-described basic configuration will be described in the following.

The above conditions (1), (2), (3), and (4) define characteristics of the optical glass of the positive lens in the first lens unit. An optical glass generally contains various metal oxides, such as $SiO_2$, $TiO_2$, $La_2O_3$, $Al_2O_3$, $Nb_2O_9$, and $Gd_2O_3$. For example, $TiO_2$ among them has the effect of increasing refractive index and decreasing the Abbe constant. Thus, a glass material containing a large content of $TiO_2$ tends to have a relatively high refractive index and relatively high dispersion. $Gd_2O_3$ has the effect of increasing the refractive index and increasing the Abbe constant. Thus, a glass material containing a large content of $Gd_2O_3$ tends to have a relatively high refractive index and relatively low dispersion, as is well known, $TiO_2$ and $Gd_2O_3$ themselves show high refractivity and high dispersion, and high refractivity and low dispersion respectively, and glass materials containing these metal oxides show characteristics similar to them.

As described above, characteristics of optical glass materials vary depending on the quantities of components they contain. Therefore, an optical glass having desired optical characteristics can be obtained by arranging the quantities of components contained. This also applies to optical ceramics. For example, an optical ceramic containing a large content of high-refractive-index, low-dispersion material(s) has a relatively high refractive index and relatively low dispersion, consequently.

Examples of nigh-refractive-index, low-dispersion materials include aforementioned $Gd_2O_3$, $Al_2O_3$, and $Lu_3Al_5O_{12}$. An optical material such as an optical glass or a ceramic having desired optical characteristics (i.e. refractive index and Abbe constant) can be prepared by arranging the quantities of these materials and metal oxides such as $SiO_2$, $TiO_2$, $La_2O_3$ etc. appropriately and melting or sintering them.

Conditional expression (1) specifies a condition for reducing residual secondary spectrum of axial chromatic aberration of the first lens unit and satisfactorily correcting secondary spectrum of axial chromatic aberration at the telephoto end.

Figure 9:
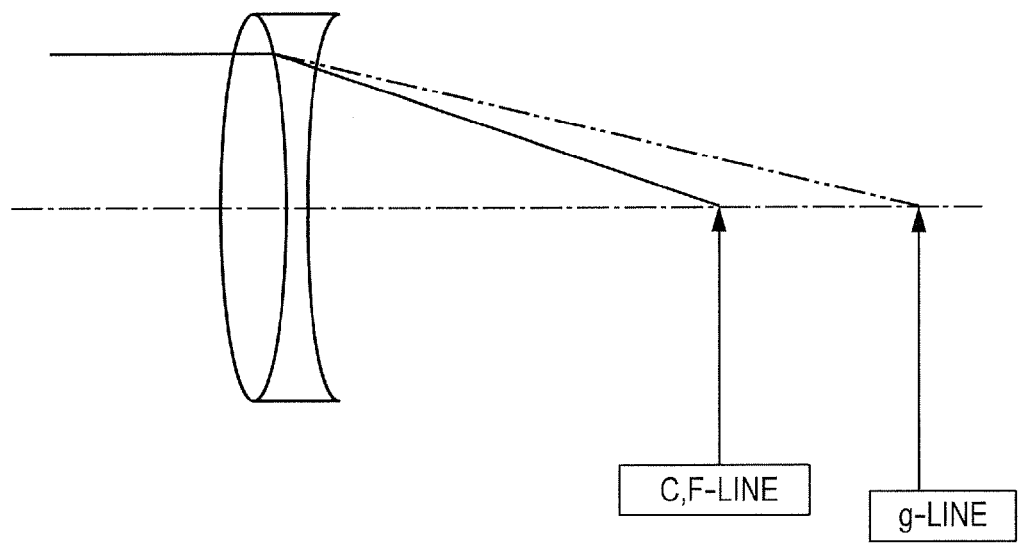
FIG. 9 is a diagram schematically illustrating achromatism of a positive lens unit for two colors and residual secondary spectrum.

FIG. 9 is a diagram about diachromatism for two colors and residual secondary spectrum.

Figure 10:
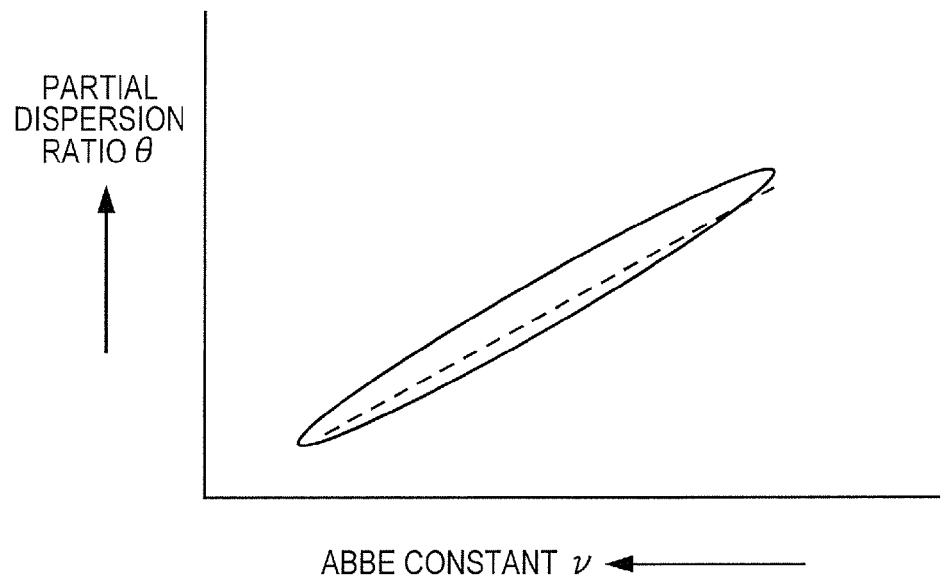
FIG. 10 is a diagram schematically showing a distribution of Abbe constants $\nu$ and partial dispersion ratios $\theta$ of optical materials.

FIG. 10 schematically shows distribution of the Abbe constants ν and the partial dispersion ratios θ of presently available optical materials. As will be seen from FIG. 10, the partial, dispersion ratios θ of the presently available optical materials are distributed in a narrow range in relation to the Abbe constants ν. Moreover, the smaller the Abbe constant ν of an optical material is, the larger its partial dispersion ratio θ tends to be.

A condition for correction of chromatic aberration of a thin lens system having a specific refractive power φ and composed of two lenses 1 and 2 respectively having a refractive index φ1 and φ2 and an Abbe constant ν1 and ν2 is expressed by the following equation:

$$\phi_1/\nu_1 + \phi_2/\nu_2 = 0 \quad (8),$$

where φ1 and φ2 satisfies the following equation:

$$\phi = \phi_1 + \phi_2 \quad (9).$$

If the equation (8) is satisfied, the image positions for the C-line and the F-line coincide with each other.

Then, φ1 and φ2 are expressed by the following equations:

$$\phi_1 = \phi \cdot \nu_1/(\nu_1 - \nu_2) \quad (10)$$

$$\phi_2 = -\phi \cdot \nu_2/(\nu_1 - \nu_2) \quad (11).$$

For achromatization of the positive lens unit shown in FIG. 9, a material having a large Abbe constant ν1 is used for the positive lens 1, and a material having a small Abbe constant ν2 is used for the negative lens 2. Consequently, according to FIG. 10, the partial dispersion ratio θ1 of the positive lens 1 is small, and the partial dispersion ratio θ2 of the negative lens 2 is large. Then, if achromatization is achieved for the F-line and the C-line, the imaging point for the g-line is displaced in the direction toward the image side (far side from the lens). The amount of this displacement is defined to be a secondary spectrum amount Δ, which is expressed by the following equation:

$$\Delta = (1/\phi) \cdot (\theta_2 - \theta_1)/(\nu_1 - \nu_2) \quad (12).$$

The secondary spectrum amount Δ of the entire lens system is expressed by the following equation:

$$\Delta = \Delta 1 \cdot \beta 2^2 \cdot \beta 3^2 \cdot \beta 4^2 + \Delta 2 \cdot (1-\beta 2) \cdot \beta 3^2 \cdot \beta 4^2 + \Delta 3 \cdot (1-\beta 3) \cdot \beta 4^2 + \Delta 4 \cdot (1-\beta 4) \quad (13),$$

where Δ1, Δ2, Δ3, and Δ4 are the amounts of secondary spectrum of the first, second, third, and fourth lens units respectively, and β2, β3, and β4 are the imaging magnifications of the second, third, and fourth lens units.

The secondary spectrum Δ is generated greatly in the first lens unit, in which the height of axial marginal rays is high in the telephoto focal length range. Therefore, axial chromatic aberration Δ in the telephoto focal length range can be reduced by reducing the amount Δ1 of secondary spectrum of axial chromatic aberration generated in the first lens unit.

Conditional expression (1) specifies interrelation between the partial dispersion ratio and the Abbe constant of the positive lens located closest to the image side among the positive lenses in the first lens unit.

If the value of (θp+0.002×vp) in conditional expression (1) falls below the lower limit, the value of θ1 becomes so small and the value of Δ1 becomes so large in conditional expression (12) that it is difficult to correct axial chromatic aberration at the telephoto end the focal length range. If the value of (θp+0.002×vp) in conditional expression (1) exceeds the upper limit, it is difficult to produce a glass material having a low dispersion and high partial dispersion ratio.

Conditional expression (2) specifies a condition about a range of the Abbe constant of the positive lens located closest to the image side among the positive lenses in the first lens unit.

If the value of the Abbe constant vp falls below the lower limit in conditional expression (2), the value of ν1 becomes so small and the value of Δ1 becomes so large in conditional expression (12) that it is difficult to correct axial chromatic aberration at the telephoto end of the focal length range. Moreover, the refractive powers of the single lenses in the first lens unit are necessitated to be high, making it difficult to correct aberrations, in particular spherical aberration and coma, at the telephoto end. If the value of the Abbe constant vp exceeds the lower limit in conditional expression (2), it is difficult to produce a glass material having a low dispersion and high refractive index.

Conditional expression (3) specifies interrelation between the Abbe constant and the refractive index of the positive lens located closest to the image side among the positive lenses in the first lens unit.

If the value of (Np+0.01×vp) in conditional expression (3) falls below the lower limit, the glass material of the positive lens does not have a high refractive index and low dispersion, and it is difficult to correct aberrations satisfactorily at the telephoto end while achieving size reduction and high zoom ratio. If the value of (Np+0.01×vp) in conditional expression (3) exceeds the upper limit, it is difficult to produce a glass material having a low dispersion and high refractive index.

Conditional expression (4) specifies a condition about a range of the refractive index of the positive lens located closest to the image side among the positive lenses in the first lens unit.

If the value of the refractive index Np falls below the lower limit of conditional expression (4), the curvature of the positive lens is necessitated to be so high that it is difficult to correct aberrations, in particular spherical aberration and coma, at the telephoto end. Moreover, the thickness of the positive lens is necessitated to be large, making size reduction difficult. If the value of the refractive index Np exceeds the upper limit of conditional expression (4), it is difficult to produce a glass material having a low dispersion and high refractive index.

Conditional expression (5) specifies a range of the ratio of the refractive power of the positive lens located closest to the image side among the positive lenses in the first lens unit to the refractive power of the first lens unit.

If this ratio falls below the lower limit of conditional expression (5) or exceeds the upper limit of conditional expression (5), it is difficult to satisfactorily correct chromatic aberration generated by the positive lens(s) in the first lens unit by a negative lens(es), leading to difficulties in correcting axial chromatic aberration and lateral chromatic aberration at the telephoto end.

In the zoom lens according to the present invention, it is more preferred to specify the refractive index and dispersion characteristics of a positive lens located second closest to the image side among the positive lenses in the first lens unit the ratio of the refractive power of this positive lens and the refractive power of the first lens unit so that satisfactory correction of chromatic aberration at the telephoto end and reduction in the overall size of the zoom lens are both achieved.

The positive lens located second closest to the image side among the positive lenses in the first lens unit satisfies the following conditions (14), (15), and (16):

$$61.0 < vp2 < 78.0 \quad (14)$$

$$2.230 < Np2 + 0.01 \times p2 < 2.330 \quad (15)$$

$$1.52 < Np2 < 1.65 \quad (16),$$

where Np2 is the refractive index of the aforementioned positive lens, and vp2 is the Abbe constant of the aforementioned positive lens.

The aforementioned positive lens also satisfies the following conditional expression (17):

$$1.70 < |fp2/f1| < 2.05 \quad (17),$$

where fp 2 is the focal length of the aforementioned positive lens.

Conditional expression (14) specifies a range of the Abbe constant of the positive lens second closest to the image side among the positive lenses in the first lens unit.

If the value of the Abbe constant vp2 falls below the lower limit of conditional expression (14), it is difficult to correct axial chromatic aberration at the telephoto end. Moreover, the refractive powers of single lenses in the first lens unit become so large that it is difficult to correct aberrations, in particular spherical aberration and coma, at the telephoto end. If the value of the Abbe constant vp2 exceeds the upper limit of conditional expression (14), it is difficult to produce a glass material having a low dispersion and high refractive index.

Conditional expression (15) specifies interrelation between the Abbe constant and the refractive index of the positive lens located second closest to the image side among the positive lenses in the first lens unit.

If the value of (Np2+0.01<×vp2) in conditional expression (15) falls below the lower limit, the glass material of the positive lens does not have a high refractive index and low dispersion, and it is difficult to correct aberrations satisfactorily at the telephoto end while achieving size reduction and high zoom ratio. If the value of (Np2+0.01×vp2) in conditional expression (15) exceeds the upper limit, it is difficult to produce a glass material having a low dispersion and high refractive index.

Conditional expression (16) specifies a condition about a range of the refractive index of the positive lens located second closest to the image side among the positive lenses in the first lens unit.

If the value of the refractive in Np2 falls below the lower limit of conditional expression (16), the curvature of the positive lens is necessitated to be so high that it is difficult to correct aberrations, in particular spherical aberration and coma, at the telephoto end. Moreover, the thickness of the positive lens is necessitated to be large, making size reduction difficult. If the value of the refractive index Np2 exceeds the upper limit of conditional expression (16), it is difficult to produce a glass material having a low dispersion and high refractive index.

Conditional expression (17) specifies the ratio of the refractive power of the positive lens located second closest to the image side among the positive lenses in the first lens unit to the refractive power of the first lens unit.

If this ratio falls below the lower limit of conditional expression. (17) or exceeds the upper limit of conditional expression (17), it is difficult to satisfactorily correct chromatic aberration generated by the positive lenses in the first lens unit by the negative lenses, leading to difficulties in correcting axial chromatic aberration and lateral chromatic aberration at the telephoto end.

In the zoom lens according to the present invention, it is more preferred that the first lens unit have the configuration described in the following, which is optimal for satisfactory correction of chromatic aberration at the telephoto end.

The first lens unit includes, in order from the object side to the image side, a first sub lens unit $1a$ which does not move and a positive second sub lens unit $1b$ which moves during focusing. The second sub lens unit is composed of two positive lenses, and the first sub lens unit is composed of three or more lenses. Alternatively, the second sub lens unit is composed of three positive lenses, and the first sub lens unit is composed of two or more lenses.

If the number of the positive lenses included in the second sub lens unit is less than two, the positive lens in the second sub lens unit is necessitated to have high curvature and high refractive power, making it difficult to correct aberrations in particular, spherical aberration and coma) at the telephoto end and variation of aberration during focusing with changes in the object distance. If the number of the positive lenses included in the second sub lens unit is four or more, the glass lens unit which moves during focusing and a moving mechanism are necessitated to be large, making it difficult to reduce the overall size of the zoom lens.

If the total number of the lenses in the second sub lens unit and the first sub lens unit is less than five, it is difficult to correct aberrations (in particular, spherical aberration and coma) at the telephoto end and aberrations (in particular, field curvature and distortion) at the wide angle end.

Moreover, in the zoom lens according to the present invention, dispersion characteristics of the positive lenses in the first lens unit are specified as a condition for satisfactory correction of aberrations such as axial chromatic aberration at the telephoto end. That is:

$$60 < vp\_av < 75 \quad (18),$$

where vp_av is the average of the Abbe constants of the positive lenses included in the first lens unit.

Conditional expression (18) specifies a range of the average Abbe constant of the positive lenses in the first lens unit.

If the value of the average Abbe constant vp_av falls below the lower limit of conditional expression (18), secondary spectrum of the first lens unit increases according to equation (12), making it difficult to satisfactorily correct axial chromatic aberration at the telephoto end. If the value of the average Abbe constant vp_av exceeds the upper limit of conditional expression (18), it is difficult to produce a glass material having a low dispersion, high refractive index, and high partial dispersion ratio for the positive lenses.

In the zoom lens according to the present invention, the ratio of the refractive power of the positive lens located closest to the image side among the positive lenses in the first lens unit and the refractive power of the first lens unit is specified so that satisfactory correction of chromatic aberration at the telephoto end and reduction in the overall size of the zoom lens are both achieved.

The positive lens located closest to the object side among the positive lenses in the first lens unit satisfies the following conditional expression (19):

$$1.55 < |fp3/f1| < 1.90 \quad (19),$$

where fp3 is the focal length of the positive lens located closest to the object side among the positive lenses in the first lens unit.

Conditional expression (19) specifies a range of the ratio of the refractive power of the positive lens located closest to the object side among the positive lenses in the first lens unit to the refractive power of the first lens unit.

If this ratio falls below the lower limit of conditional expression (19) or exceeds the upper limit of conditional expression (19), it is difficult to satisfactorily correct chromatic aberration generated by the positive lenses in the first lens unit by the negative lenses with the above-described configuration of the first lens unit and the above-described glass materials of the lenses, leading to difficulties in correcting axial chromatic aberration and lateral chromatic aberration at the telephoto end.

By using the above-described zoom lens according to the present invention in an image pickup apparatus, it is possible to provide an image pickup apparatus that can enjoy advantageous effects of the zoom lens according to the present invention.

First Embodiment

Figure 1B:
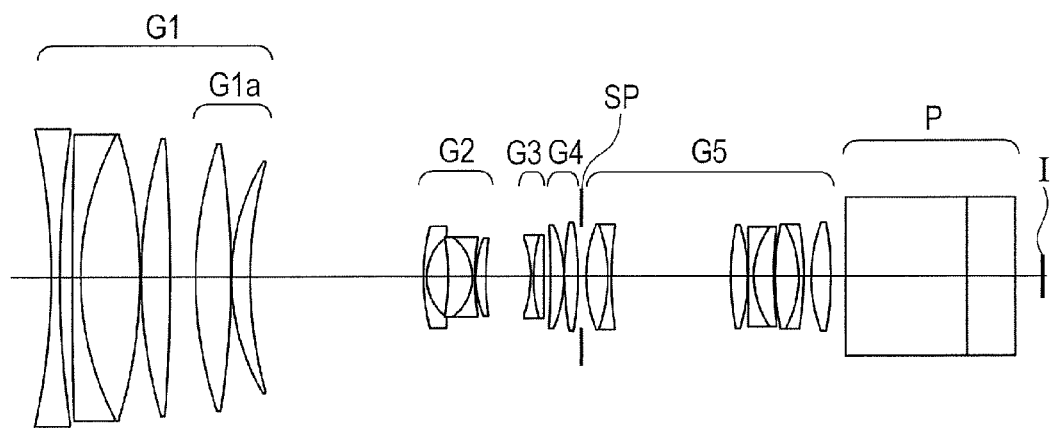
FIG. 1B is a cross sectional view of the zoom lens according to the first numerical embodiment at the telephoto end.
Figure 2A:
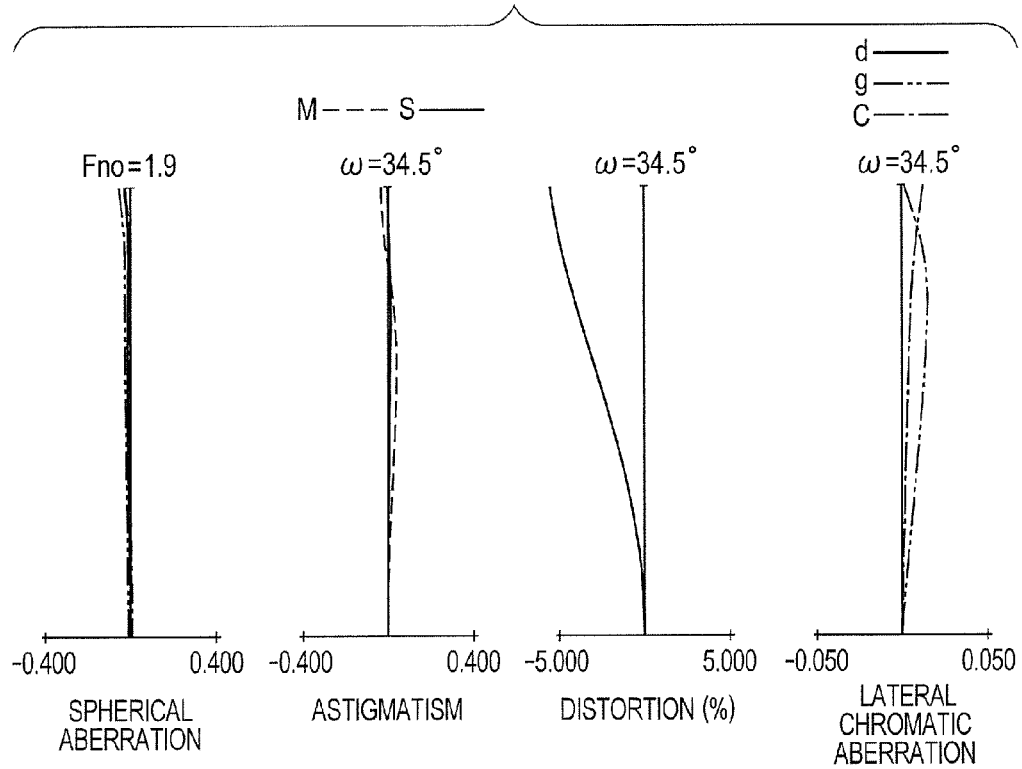
FIG. 2A is an aberration diagram of the zoom lens according to the first numerical embodiment the wide angle end.
Figure 2B:
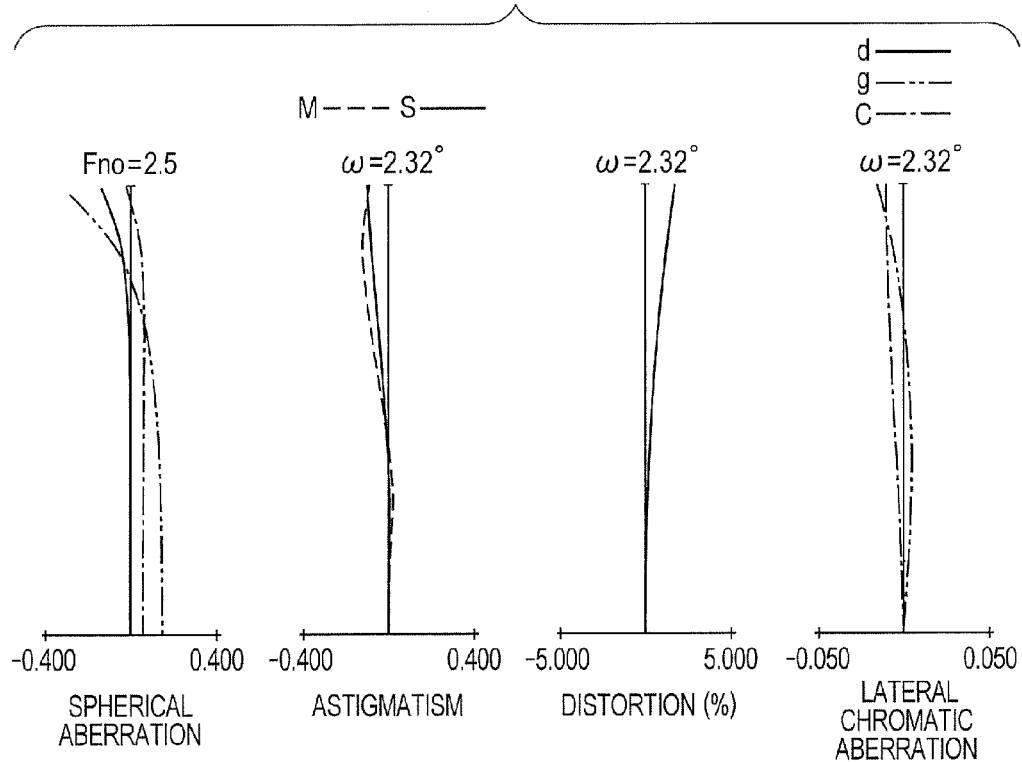
FIG. 2B is an aberration diagram of the zoom lens according to the first numerical embodiment at the telephoto end.

FIGS. 1A and 1B are cross sectional views of a zoom lens according to a first numerical embodiment of the present invention at the wide angle end and the telephoto end respectively FIGS. 2A and 2B are aberration diagrams of the zoom lens according to the first numerical embodiment at the wide angle end and the telephoto end respectively.

In FIGS. 1A and 1B, a first lens unit G1 is a lens unit having a positive refractive power. The first lens unit G1 is composed of, in order from the object side to the image side, a first sub lens unit, which is fixed, and a second sub lens unit G1a. The lens unit G1a (second sub lens unit) included in the first lens unit G1 is advanced for focusing, enabling focusing onto an object distance down to 0.6 meter. A second lens unit G2 is a variator having a negative refractive power for zooming. The second lens unit G2 is moved along the optical axis toward the image plane to perform zooming from the wide angle end to the telephoto end. A third lens unit G3 is a variator having a negative refractive power, which is moved during zooming. During zooming from the wide angle end to the telephoto end, the third lens unit G3 moves along a locus that is convex to the object side. A fourth lens unit G4 is a compensator having a positive refractive power. During zooming, the fourth lens unit moves along the optical axis nonlinearly to correct image plane variation with zooming. While the lens unit used to correct image plane variation is the fourth lens unit in this embodiment, the third lens unit may serve as a unit for correcting image plane variation. The zoom lens also includes a stop SP and a fifth lens unit G5, which is a relay unit (or rear unit) having a positive refractive power having the function of imaging. A focal length convertor or the like may be provided in an air gap inside the fifth lens unit G5. FIGS. 1A and 1B also show a glass block P, which may include a color separation prism and/or optical filter etc., and an image pickup surface I.

Values associated with the above-described conditional expressions in this embodiment will be presented in Table 1. This numerical embodiment satisfies all the conditional expressions. Thus, the zoom lens according to this numerical embodiment has excellent optical performance and is small in size and in weight while having a wide angle of view with a focal length of 8.0 mm at the wide angle end and a high zoom ratio of 17.0.

(Numerical Embodiment 1)
Lengths in the following table are in millimeters.

| SN | r | d | nd | vd | θgF | ED | FL |
|---|---|---|---|---|---|---|---|
| 1 | −169.77786 | 2.30000 | 1.720467 | 34.70 | 0.5834 | 76.159 | −140.144 |
| 2 | 254.81304 | 3.34847 | 1.000000 | | | 73.499 | |
| 3 | 1251.39784 | 2.30000 | 1.800999 | 34.97 | 0.5863 | 73.260 | −101.803 |
| 4 | 76.97873 | 16.10578 | 1.496999 | 81.54 | 0.5374 | 72.014 | 97.320 |
| 5 | −122.03946 | 0.40000 | 1.000000 | | | 72.178 | |
| 6 | 124.54683 | 7.77610 | 1.433870 | 95.10 | 0.5373 | 70.954 | 227.761 |
| 7 | −475.08007 | 6.89910 | 1.000000 | | | 70.668 | |
| 8 | 106.86859 | 9.61483 | 1.618000 | 63.33 | 0.5441 | 68.157 | 117.060 |
| 9 | −218.75768 | 0.15000 | 1.000000 | | | 67.527 | |
| 10 | 57.69622 | 5.08451 | 1.000000 | 49.00 | 0.5575 | 58.940 | 161.247 |
| 11 | 108.95608 | (variable) | 1.000000 | | | 58.195 | |
| 12 | 49.12369 | 0.90000 | 1.882997 | 40.76 | 0.5667 | 25.115 | −20.089 |
| 13 | 12.97522 | 5.85046 | 1.000000 | | | 19.926 | |
| 14 | −57.40657 | 6.56125 | 1.808095 | 22.76 | 0.6307 | 19.716 | 18.771 |
| 15 | −12.71730 | 0.70000 | 1.882997 | 40.76 | 0.5667 | 19.211 | −11.803 |
| 16 | 61.20243 | 0.20000 | 1.000000 | | | 18.854 | |
| 17 | 25.01570 | 2.75854 | 1.666800 | 33.05 | 0.5957 | 19.073 | 58.881 |
| 18 | 65.07644 | (variable) | 1.000000 | | | 18.715 | |
| 19 | −27.02763 | 0.70000 | 1.756998 | 47.82 | 0.5566 | 18.304 | −20.802 |
| 20 | 38.60733 | 2.86890 | 1.846490 | 23.90 | 0.6217 | 19.913 | 44.533 |
| 21 | −2631.66644 | (variable) | 1.000000 | | | 20.521 | |
| 22 | −221.88716 | 3.66413 | 1.638539 | 55.38 | 0.5485 | 24.974 | 60.984 |
| 23 | −33.46289 | 0.15000 | 1.000000 | | | 25.687 | |
| 24 | 81.32540 | 3.70426 | 1.516330 | 64.14 | 0.5352 | 26.774 | 77.998 |
| 25 | −79.12072 | (variable) | 1.000000 | | | 26.876 | |
| 26 | 0.00000 | 1.30000 | 1.000000 | | | 26.381 | |
| 27 | 35.75300 | 5.92435 | 1.517417 | 52.43 | 0.5564 | 26.111 | 36.840 |
| 28 | −38.89373 | 0.90000 | 1.834807 | 42.71 | 0.5642 | 25.719 | −31.740 |
| 29 | 85.49479 | 32.40000 | 1.000000 | | | 25.210 | |
| 30 | 64.91346 | 4.60586 | 1.496999 | 81.54 | 0.5374 | 25.735 | 54.185 |
| 31 | −45.16238 | 0.29989 | 1.000000 | | | 25.553 | |
| 32 | −548.32958 | 1.40000 | 1.834030 | 37.20 | 0.5775 | 24.862 | −24.910 |
| 33 | 21.76282 | 5.37767 | 1.487490 | 70.23 | 0.5300 | 24.200 | 54.913 |
| 34 | 105.35972 | 0.28995 | 1.000000 | | | 24.580 | |
| 35 | 59.03984 | 6.49972 | 1.501270 | 56.50 | 0.5536 | 24.899 | 38.095 |
| 36 | −27.35414 | 1.40000 | 1.834807 | 42.71 | 0.5642 | 25.079 | −51.090 |
| 37 | −77.28728 | 2.04080 | 1.000000 | | | 25.921 | |
| 38 | 38.65976 | 5.30185 | 1.501270 | 56.50 | 0.5536 | 26.910 | 52.431 |
| 39 | −79.35776 | 4.00000 | 1.000000 | | | 26.681 | |
| 40 | 0.00000 | 33.00000 | 1.608590 | 46.44 | 0.5664 | 40.000 | |
| 41 | 0.00000 | 13.20000 | 1.516330 | 64.14 | 0.5352 | 40.000 | |
| 42 | 0.00000 | 0.00000 | 1.000000 | | | 40.000 | |

SN: surface number
ED: effective diameter
FL: focal length.

Various Data
zoom ratio 17.00

| | wide angle | intermediate | telephoto |
|---|---|---|---|
| focal length | 8.00 | 33.20 | 136.00 |
| F-number | 1.90 | 1.90 | 2.50 |
| angle of field | 34.51 | 9.41 | 2.32 |
| image height | 5.50 | 5.50 | 5.50 |
| overall lens length | 269.40 | 269.40 | 269.40 |
| BF | 7.46 | 7.46 | 7.46 |
| d11 | 0.80 | 32.92 | 47.01 |
| d18 | 49.21 | 10.36 | 12.26 |
| d21 | 6.22 | 11.27 | 1.79 |
| d25 | 5.74 | 7.43 | 0.91 |
| d42 | 7.46 | 7.46 | 7.46 |
| entrance P | 47.90 | 163.16 | 577.64 |
| exit p | 401.39 | 401.39 | 401.39 |

-continued (Numerical Embodiment 1)
Lengths in the following table are in millimeters.

| front pp | 56.06 | 199.16 | 760.60 |
|---|---|---|---|
| rear pp | −0.54 | −25.74 | −128.54 | entrance p: entrance pupil position
exit p: exit pupil position
front pp: front principal point position
rear pp: rear principal point position Zoom Lens Unit Data

| unit | LS | FL | LUL | front pp | rear pp |
|---|---|---|---|---|---|
| 1 | 1 | 61.00 | 53.98 | 34.82 | 3.79 |
| 2 | 12 | −13.50 | 16.97 | 2.40 | −9.03 |
| 3 | 19 | −39.48 | 3.57 | −0.06 | −2.02 |
| 4 | 22 | 34.61 | 7.52 | 3.06 | −1.78 |
| 5 | 26 | 49.21 | 117.94 | 55.44 | −36.73 |

LS: leading surface of the unit
FL: focal length
LUL: lens unit length
front pp: front principal point position
rear pp: rear principal point position

Second Embodiment

Figure 3A:
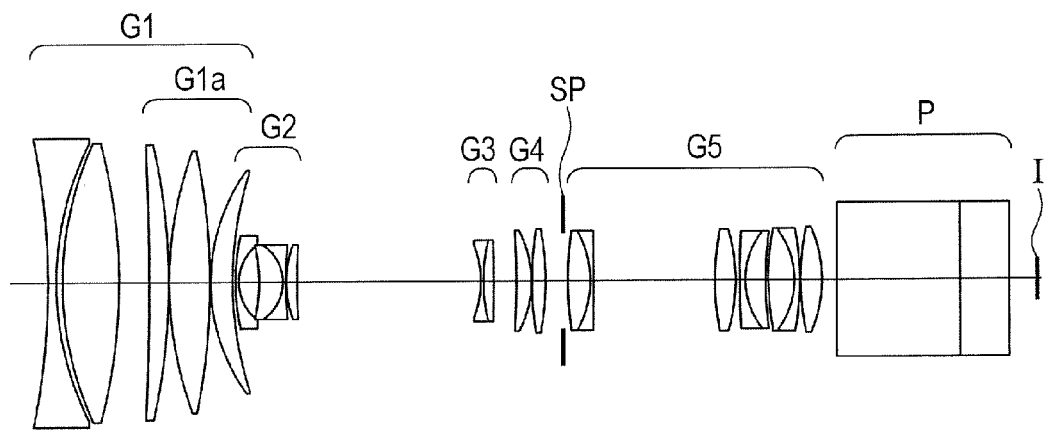
FIG. 3A is a cross sectional view of a zoom lens according to a second numerical embodiment at the wide angle end.
Figure 3B:
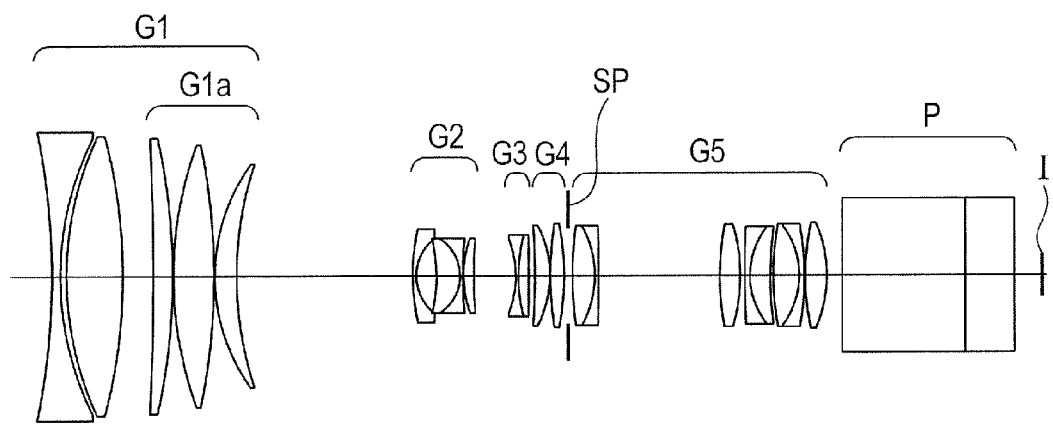
FIG. 3B is a cross sectional view of the zoom lens according to the second numerical embodiment at the telephoto end.
Figure 4A:
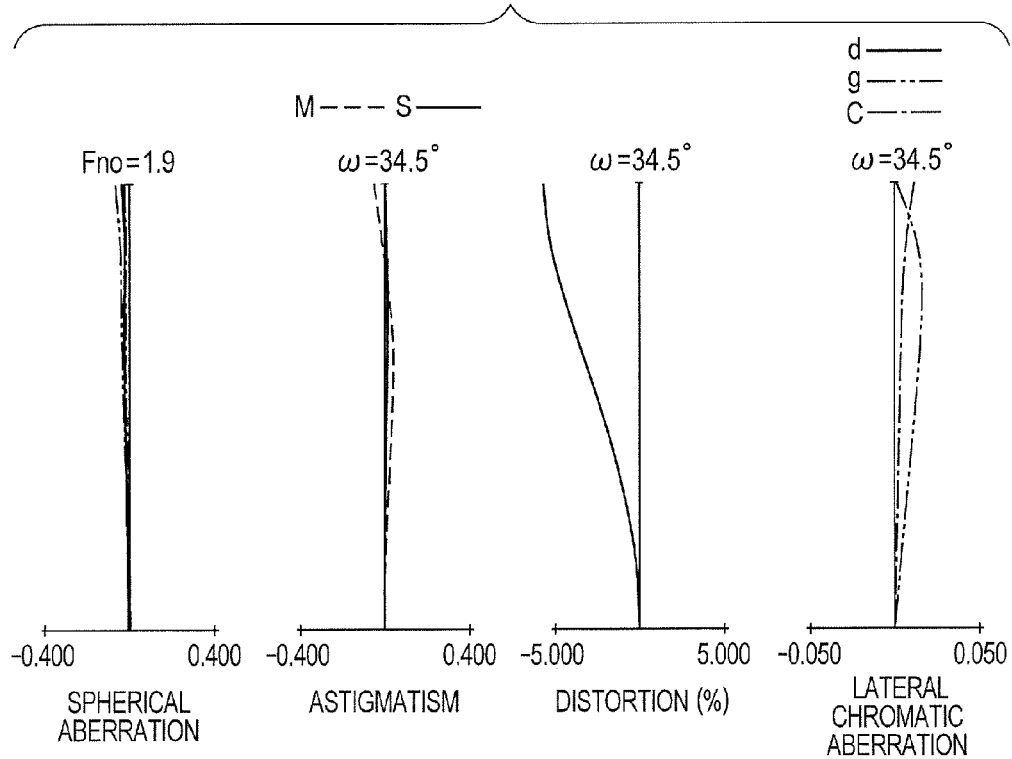
FIG. 4A is an aberration diagram of the zoom lens according to the second numerical embodiment at the wide angle end.
Figure 4B:
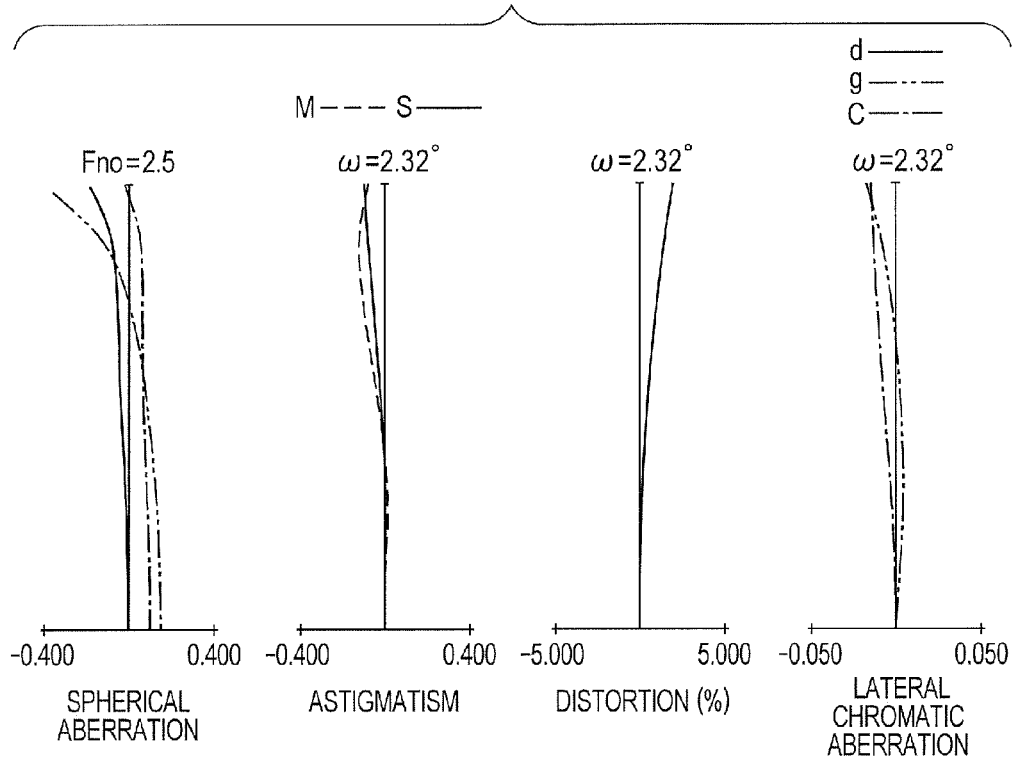
FIG. 4B is an aberration diagram of the zoom lens according to the second numerical embodiment at the telephoto end.

FIGS. 3A and 3B are cross sectional views of a zoom lens according to a second numerical embodiment of the present invention at the wide angle end and the telephoto end respectively. FIGS. 4A and 4B are aberration diagrams of the zoom lens according to the second numerical embodiment at the wide angle end and the telephoto end respectively.

In FIGS. 3A and 3B, a first lens unit G1 is a lens unit having a positive refractive power. The first lens unit G1 is composed of, in order from the object side to the image side, a first sub lens unit, which is fixed, and a second sub lens unit G1a. The lens unit G1a (second sub lens unit) included in the first lens unit G1 is advanced for focusing, enabling focusing onto an object distance down to 0.6 meter. A second lens unit G2 is a variator having a negative refractive power, which is moved during zooming. Tho second lens unit G2 is moved along the optical axis toward the image plane to perform zooming from the wide angle end to the telephoto end. A third lens unit G3 is a variator having a negative refractive power, which is moved during zooming. During zooming from the wide angle end to the telephoto end, the third lens unit G3 moves along a locus that is convex to the object side. A fourth lens unit G4 is a compensator having a positive refractive power. During zooming, the fourth lens unit moves along the optical axis nonlinearly to correct image plane variation with zooming. While the lens unit used to correct image plane variation is the fourth lens unit in this embodiment, the third lens unit may serve as a unit for correcting image plane variation. The zoom lens also includes a stop SP and a fifth lens unit G5, which is a relay unit (or rear unit) having a positive refractive power having the function of imaging. A focal length convertor or the like may be provided in an air gap inside the fifth lens unit G5. FIGS. 3A and 3F also show a glass block P, which may include a color separation prism and/or optical filter etc., and an image pickup surface I.

Values associated with the above-described conditional expressions in this embodiment will be presented in Table 1. This numerical embodiment satisfies all the conditional expressions. Thus, the zoom lens according to this numerical embodiment has excellent optical performance and is small in size and light in weight while having a wide angle of view with a focal length of 8.0 mm at the wide angle end and a high zoom ratio of 17.0.

(Numerical Embodiment 2)
Lengths in the following table are in millimeters.

| SN | r | d | nd | vd | θgF | ED | FL |
|---|---|---|---|---|---|---|---|
| 1 | −192.83740 | 2.20000 | 1.800000 | 23.84 | 0.6017 | 76.089 | −72.184 |
| 2 | 83.79132 | 1.64531 | 1.000000 | | | 73.033 | |
| 3 | 89.86921 | 15.06578 | 1.496999 | 81.54 | 0.5374 | 73.562 | 114.343 |
| 4 | −147.11913 | 8.10324 | 1.000000 | | | 73.558 | |
| 5 | −775.57772 | 5.20036 | 1.433870 | 95.10 | 0.5373 | 72.531 | 499.411 |
| 6 | −170.04046 | 0.15000 | 1.000000 | | | 72.258 | |
| 7 | 103.29239 | 10.88096 | 1.000000 | 74.70 | 0.5392 | 69.001 | 122.254 |
| 8 | −174.18080 | 0.15000 | 1.000000 | | | 68.335 | |
| 9 | 51.30868 | 5.88840 | 1.000000 | 45.50 | 0.5720 | 58.425 | 130.653 |
| 10 | 96.85837 | (variable) | 1.000000 | | | 57.492 | |
| 11 | 58.71183 | 0.90000 | 1.882997 | 40.76 | 0.5667 | 23.857 | −18.633 |
| 12 | 12.81666 | 5.42537 | 1.000000 | | | 18.993 | |
| 13 | −42.61384 | 6.32762 | 1.008095 | 22.76 | 0.6307 | 18.898 | 18.433 |
| 14 | −11.66413 | 0.70000 | 1.882997 | 40.76 | 0.5667 | 18.577 | −11.805 |
| 15 | 92.65428 | 0.20000 | 1.000000 | | | 18.564 | |
| 16 | 29.37501 | 2.85063 | 1.666800 | 33.05 | 0.5957 | 18.787 | 54.294 |
| 17 | 145.23232 | (variable) | 1.000000 | | | 18.522 | |

-continued (Numerical Embodiment 2)
Lengths in the following table are in millimeters.

| | | | | | | | |
|---|---|---|---|---|---|---|---|
| 18 | −26.49302 | 0.70000 | 1.756998 | 47.82 | 0.5566 | 16.458 | −21.883 |
| 19 | 45.30898 | 2.74723 | 1.846490 | 23.90 | 0.6217 | 20.047 | 48.421 |
| 20 | −465.30249 | (variable) | 1.000000 | | | 20.662 | |
| 21 | −186.08181 | 3.97301 | 1.638539 | 55.38 | 0.5485 | 24.974 | 53.632 |
| 22 | −29.27056 | 0.15000 | 1.000000 | | | 25.680 | |
| 23 | 89.15466 | 3.70116 | 1.516330 | 64.14 | 0.5352 | 26.528 | 77.057 |
| 24 | −71.31119 | (variable) | 1.000000 | | | 26.575 | |
| 25 | 0.00000 | 1.30000 | 1.000000 | | | 25.691 | |
| 26 | 98.11268 | 5.97787 | 1.517417 | 52.43 | 0.5564 | 25.375 | 41.557 |
| 27 | −27.12071 | 0.90000 | 1.834807 | 42.71 | 0.5642 | 24.982 | −33.436 |
| 28 | −815.51185 | 32.40000 | 1.000000 | | | 25.094 | |
| 29 | 72.71860 | 5.44338 | 1.496999 | 81.54 | 0.5374 | 26.037 | 59.478 |
| 30 | −48.80707 | 1.22177 | 1.000000 | | | 25.779 | |
| 31 | 273.82070 | 1.40000 | 1.834030 | 37.20 | 0.5775 | 24.980 | −27.112 |
| 32 | 20.96106 | 5.45798 | 1.487490 | 70.23 | 0.5300 | 24.164 | 53.301 |
| 33 | 97.78424 | 0.71894 | 1.000000 | | | 24.459 | |
| 34 | 73.06073 | 6.98697 | 1.501270 | 56.50 | 0.5536 | 24.774 | 34.866 |
| 35 | −22.36067 | 1.40000 | 1.834807 | 42.71 | 0.5642 | 24.960 | −37.963 |
| 36 | −77.09238 | 0.24720 | 1.000000 | | | 26.209 | |
| 37 | 67.90108 | 5.79123 | 1.501270 | 56.50 | 0.5536 | 26.951 | 46.832 |
| 38 | −35.08035 | 4.00000 | 1.000000 | | | 27.026 | |
| 39 | 0.00000 | 33.00000 | 1.608590 | 46.44 | 0.5664 | 40.000 | |
| 40 | 0.00000 | 13.20000 | 1.516330 | 64.14 | 0.5352 | 40.000 | |
| 41 | 0.00000 | 0.00000 | 1.000000 | | | 40.000 | |

SN: surface number
ED: effective diameter
FL: focal length.

Various Data
zoom ratio 17.00

| | wide angle | intermediate | telephoto |
|---|---|---|---|
| focal length | 8.00 | 33.07 | 136.00 |
| F-number | 1.90 | 1.92 | 2.50 |
| angle of field | 34.51 | 9.44 | 2.32 |
| image height | 5.50 | 5.50 | 5.50 |
| overall lens length | 264.61 | 264.61 | 264.61 |
| BF | 7.45 | 7.45 | 7.45 |
| d10 | 0.79 | 32.85 | 46.98 |
| d17 | 49.20 | 10.48 | 11.17 |
| d20 | 6.08 | 11.17 | 1.68 |
| d24 | 4.69 | 6.27 | 0.94 |
| d41 | 7.45 | 7.45 | 7.45 |
| entrance P | 45.15 | 160.24 | 571.65 |
| exit p | 349.49 | 349.49 | 349.49 |
| front pp | 53.34 | 196.51 | 761.72 |
| rear pp | −0.55 | −25.62 | −128.55 | entrance p: entrance pupil position
exit p: exit pupil position
front pp: front principal point position
rear pp: rear principal point position Zoom Lens Unit Data

| unit | LS | FL | LUL | front pp | rear pp |
|---|---|---|---|---|---|
| 1 | 1 | 61.00 | 49.28 | 32.03 | 3.05 |
| 2 | 11 | −13.50 | 16.40 | 1.69 | −9.72 |
| 3 | 18 | −40.54 | 3.45 | −0.17 | −2.06 |
| 4 | 21 | 32.01 | 7.82 | 3.29 | −1.73 |
| 5 | 25 | 47.60 | 119.45 | 54.46 | −28.42 |

Figure 5A:
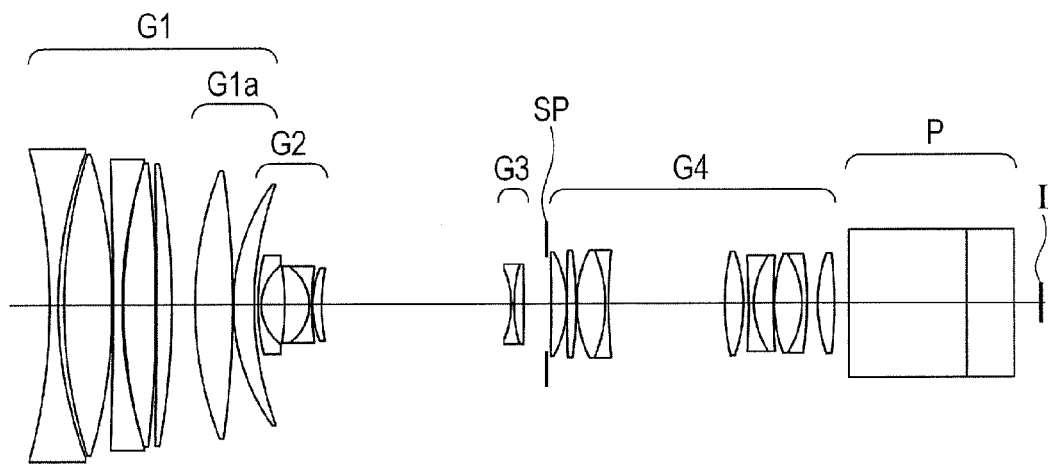
FIG. 5A is a cross sectional view of a zoom lens according to a third numerical embodiment at the wide angle end.
Figure 5B:
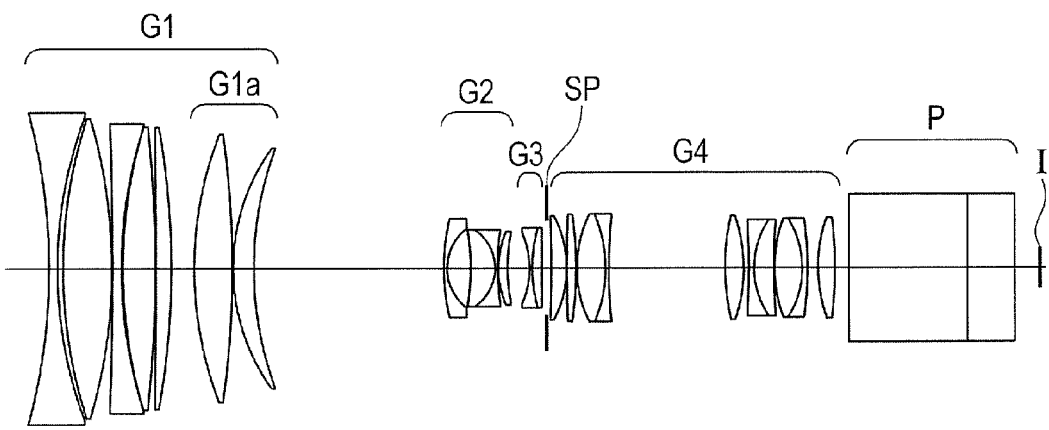
FIG. 5B is a cross sectional view of the zoom lens according to the third numerical embodiment at the telephoto end.
Figure 6A:
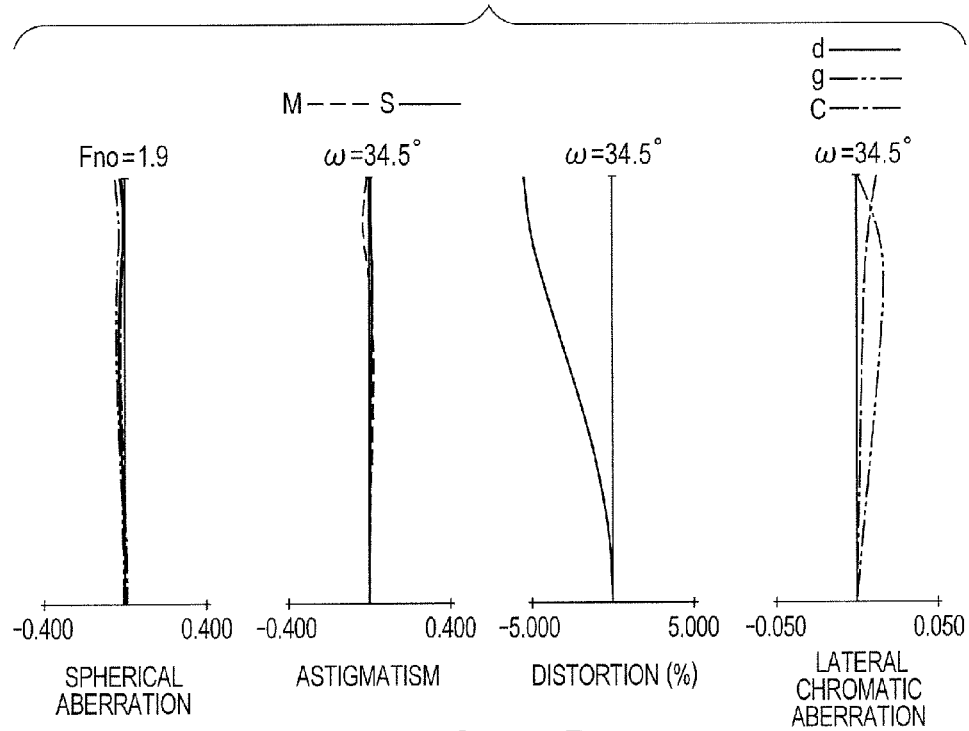
FIG. 6A is an aberration diagram of the zoom lens according to the third numerical embodiment at the wide angle end.
Figure 6B:
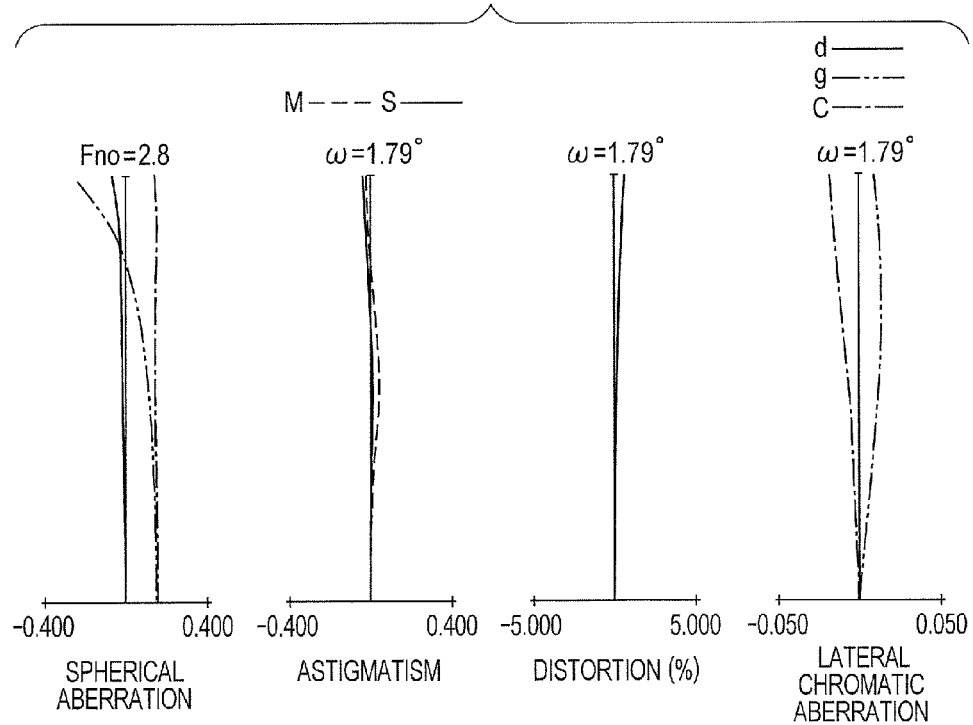
FIG. 6B is an aberration diagram of the zoom lens according to the third numerical embodiment at the telephoto end.

LS: leading surface of the unit
FL: focal length
LUL: lens unit length
front pp: front principal point position
rear pp: rear principal point position Third Embodiment FIGS. 5A and 5B are cross sectional views of a zoom lens according to a third numerical embodiment of the present invention at the wide angle end and the telephoto end respectively. FIGS. 6A and 6B are aberration diagrams or the zoom lens according to the third numerical embodiment at the wide angle end and the telephoto end respectively.

In FIGS. 5A and 5B, a first lens unit G1 is a lens unit having a positive refractive power. The first lens unit is composed of, in order from the object side to the image side, a first sub lens unit, which is fixed, and a second sub lens unit Ga1. The lens unit G1a (second sub lens unit) included in the first lens unit G1 is advanced for focusing, enabling focusing onto an obiact distance down to 0.85 meter. A second lens unit G2 is a variator for zooming having a negative refractive power. The second lens unit G2 is moved along the optical axis toward the image plane to perform zooming from the wide angle end to the telephoto end. A third lens unit G3 is a compensator having a negative refractive power. During zooming from the wide angle end to the telephoto end, the third lens unit G3 moves along the optical axis nonlinearly to correct image plane variation with zooming. The zoom lens also includes a stop SP and a fourth lens unit G4, which is a relay unit (or rear unit) having a positive refractive power having the function of imaging. A focal length convertor or the like may be provided in an air gap inside the fourth lens unit G4. FIGS. 5A and 5B also show a glass block P, which may include a color separation prism and/or optical filter etc, and an image pickup surface I.

Values associated with the above-described conditional expressions in this embodiment will be presented in Table 1. This numerical embodiment satisfies all the conditional expressions. Thus, the zoom lens according to this numerical embodiment has excellent optical performance and is small in size and light in weight while having a wide angle of view with a focal length of 8.0 mm at the wide angle end and a high zoom ratio of 22.0.

(Numerical Embodiment 3)
Lengths in the following table are in millimeters.

| SN | r | d | nd | vd | θgF | ED | FL |
|---|---|---|---|---|---|---|---|
| 1 | −167.15959 | 2.30000 | 1.800999 | 34.97 | 0.5863 | 84.405 | −87.168 |
| 2 | 122.05012 | 1.59927 | 1.000000 | | | 82.054 | |
| 3 | 137.65465 | 13.58263 | 1.595220 | 67.74 | 0.5442 | 81.000 | 122.144 |
| 4 | −149.50787 | 0.20000 | 1.000000 | | | 81.000 | |
| 5 | −1145.55537 | 2.50000 | 1.720467 | 34.70 | 0.5834 | 79.811 | −162.840 |
| 6 | 131.82298 | 0.36487 | 1.000000 | | | 77.850 | |
| 7 | 140.33150 | 9.02766 | 1.487490 | 70.23 | 0.5300 | 77.848 | 209.425 |
| 8 | −371.36840 | 0.15000 | 1.000000 | | | 77.766 | |
| 9 | −2857.69605 | 4.27891 | 1.487490 | 70.23 | 0.5300 | 77.406 | 498.306 |
| 10 | −224.69931 | 6.38769 | 1.000000 | | | 77.267 | |
| 11 | 104.69643 | 10.63467 | 1.000000 | 68.00 | 0.5450 | 73.559 | 119.058 |
| 12 | −268.82484 | 0.15000 | 1.000000 | | | 72.869 | |
| 13 | 58.07817 | 5.80977 | 1.000000 | 45.50 | 0.5720 | 65.960 | 169.154 |
| 14 | 98.18774 | (variable) | 1.000000 | | | 65.003 | |
| 15 | 59.22267 | 0.90000 | 1.882997 | 40.76 | 0.5667 | 26.302 | −20.713 |
| 16 | 13.93577 | 6.58354 | 1.000000 | | | 20.923 | |
| 17 | −65.51230 | 6.78315 | 1.808095 | 22.76 | 0.6307 | 20.229 | 18.641 |
| 18 | −12.92474 | 0.70000 | 1.882997 | 40.76 | 0.5667 | 19.631 | −12.291 |
| 19 | 72.04865 | 0.20000 | 1.000000 | | | 19.129 | |
| 20 | 25.47596 | 2.51814 | 1.666800 | 33.05 | 0.5957 | 19.237 | 72.448 |
| 21 | 51.35444 | (variable) | 1.000000 | | | 18.820 | |
| 22 | −24.82737 | 0.70000 | 1.756998 | 47.82 | 0.5566 | 18.662 | −20.020 |
| 23 | 39.88332 | 2.78385 | 1.846490 | 23.90 | 0.6217 | 20.513 | 44.480 |
| 24 | −788.62441 | (variable) | 1.000000 | | | | |
| 25 | 0.00000 | 1.30000 | 1.000000 | | | 26.270 | |
| 26 | −318.66319 | 4.23729 | 1.633539 | 55.38 | 0.5485 | 27.081 | 53.682 |
| 27 | −31.23050 | 0.15000 | 1.000000 | | | 27.726 | |
| 28 | 542.40774 | 2.54649 | 1.516330 | 64.14 | 0.5352 | 28.486 | 167.175 |
| 29 | −102.94259 | 0.15000 | 1.000000 | | | 28.651 | |
| 30 | 34.16041 | 8.02896 | 1.517417 | 52.43 | 0.5564 | 28.822 | 35.967 |
| 31 | −37.97240 | 0.90000 | 1.834807 | 42.71 | 0.5642 | 28.217 | −35.711 |
| 32 | 143.93248 | 32.40000 | 1.000000 | | | 27.834 | |
| 33 | 63.63709 | 5.20229 | 1.496999 | 81.54 | 0.5374 | 27.781 | 53.421 |
| 34 | −44.54085 | 1.49985 | 1.000000 | | | 27.560 | |
| 35 | −177.11812 | 1.40000 | 1.834030 | 37.20 | 0.5775 | 25.646 | −25.053 |
| 36 | 23.94767 | 5.54244 | 1.487490 | 70.23 | 0.5300 | 24.982 | 54.584 |
| 37 | 214.69368 | 0.19232 | 1.000000 | | | 25.316 | |
| 38 | 40.03669 | 7.72605 | 1.501270 | 56.50 | 0.5536 | 25.839 | 32.460 |
| 39 | −25.82221 | 1.40000 | 1.834807 | 42.71 | 0.5642 | 25.720 | −41.801 |
| 40 | −100.19022 | 2.97511 | 1.000000 | | | 26.356 | |
| 41 | 42.10518 | 4.65877 | 1.501270 | 56.50 | 0.5536 | 26.802 | 62.715 |
| 42 | −121.49196 | 4.00000 | 1.000000 | | | 26.498 | |
| 43 | 0.00000 | 33.00000 | 1.608590 | 46.44 | 0.5664 | 40.000 | |
| 44 | 0.00000 | 13.20000 | 1.516330 | 64.14 | 0.5352 | 40.000 | |
| 45 | 0.00000 | 0.00000 | 1.000000 | | | 40.000 | |

SN: surface number
ED: effective diameter
FL: focal length.

Various Data
zoom ratio 22.00

| | wide angle | intermediate | telephoto |
|---|---|---|---|
| focal length | 8.00 | 37.52 | 176.00 |
| F-number | 1.90 | 1.89 | 2.80 |
| angle of field | 34.51 | 8.34 | 1.79 |
| image height | 5.50 | 5.50 | 5.50 |
| overall lens length | 276.45 | 276.45 | 276.45 |

-continued (Numerical Embodiment 3)
Lengths in the following table are in millimeters.

| | | | |
|---|---|---|---|
| BF | 7.47 | 7.47 | 7.47 |
| d14 | 1.04 | 38.26 | 52.83 |
| d21 | 52.89 | 10.90 | 6.15 |
| d24 | 6.39 | 11.15 | 1.33 |
| d45 | 7.47 | 7.47 | 7.47 |
| entrance P | 50.28 | 194.54 | 601.08 |
| exit p | 365.58 | 365.58 | 365.58 |
| front pp | 58.46 | 235.99 | 863.58 |
| rear pp | −0.53 | −30.05 | −168.53 | entrance p: entrance pupil position
exit p: exit pupil position
front pp: front principal point position
rear pp: rear principal point position Zoom Lens Unit Data

| unit | LS | FL | LUL | front pp | rear p |
|---|---|---|---|---|---|
| 1 | 1 | 68.00 | 56.99 | 34.91 | 2.65 |
| 2 | 15 | −13.80 | 17.68 | 2.65 | −9.27 |
| 3 | 22 | −36.92 | 3.48 | −0.11 | −2.02 |
| 4 | 25 | 59.38 | 130.51 | 67.34 | −136.72 |

Figure 7A:
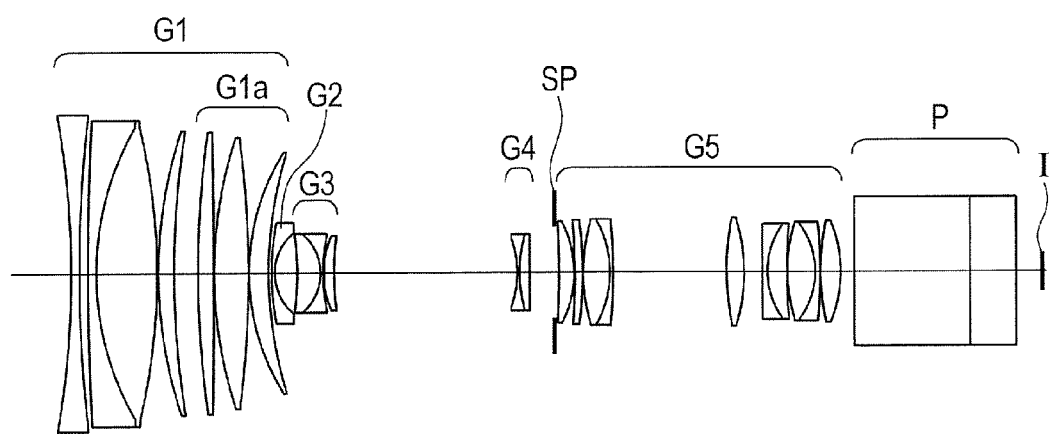
FIG. 7A is a cross sectional view of a zoom lens according to a fourth numerical embodiment at the wide angle end.
Figure 7B:
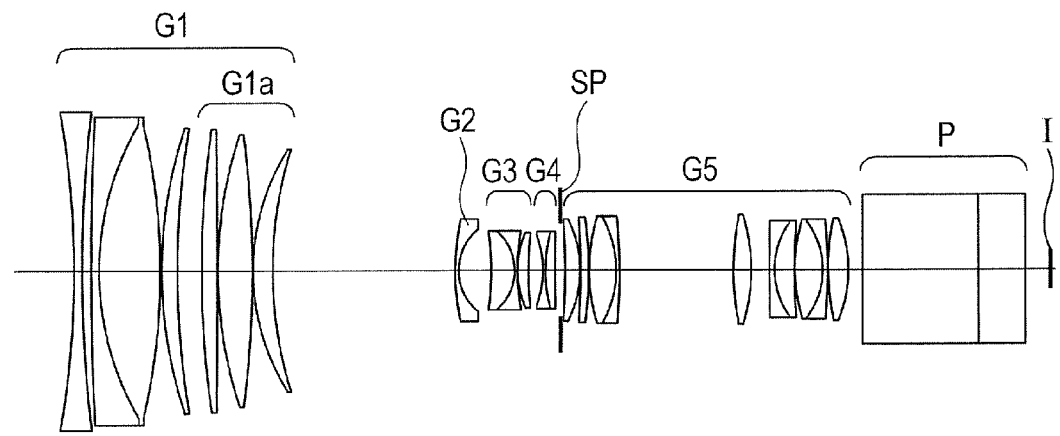
FIG. 7B is a cross sectional view of the zoom lens according to the fourth numerical embodiment at the telephoto end.
Figure 8A:
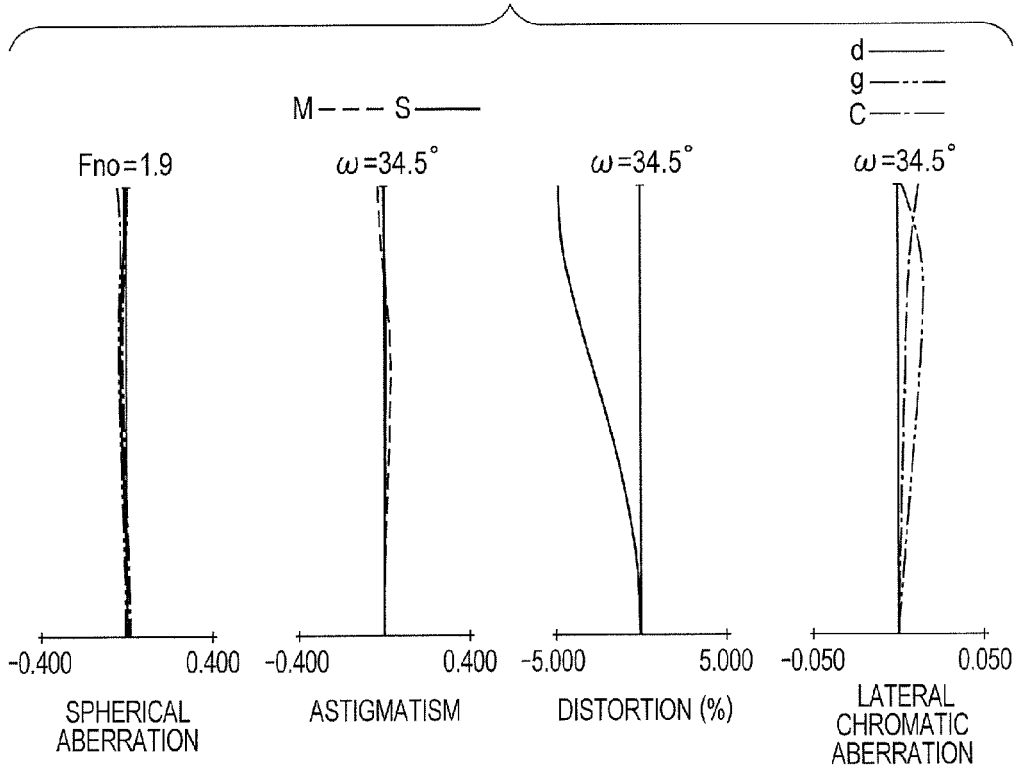
FIG. 8A is an aberration diagram of the zoom lens according to the fourth numerical embodiment at the wide angle end.
Figure 8B:
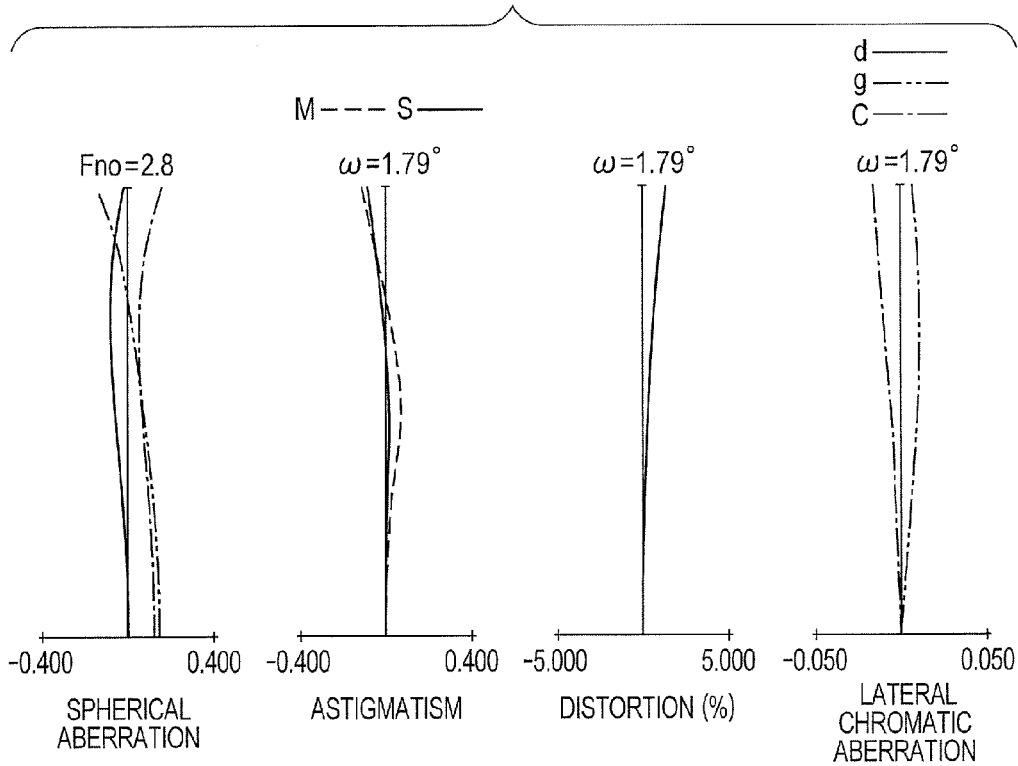
FIG. 8B is an aberration diagram of the zoom lens according to the fourth numerical embodiment at the telephoto end.

LS: leading surface of the unit
FL: focal length
LUL: lens unit length
front pp: front principal point position
rear pp: rear principal point position Fourth Embodiment FIGS. 7A and 7B are cross sectional views of a zoom lens according to a fourth numerical embodiment of the present invention at the wide angle end and the telephoto end respectively. FIGS. 8A and 8B are aberration diagrams of the zoom lens according to the fourth numerical embodiment at the wide angle end and the telephoto end respectively.

In FIGS. 7A and 7B, a first lens unit G1 is a lens unit having a positive refractive power. The first lens unit G1 is composed of, in order from the object side to the image side, a first sub lens unit, which is fixed, and a second sub lens unit G1a. The lens unit G1a (second sub lens unit) included in the first lens unit G1 is advanced for focusing, enabling focusing onto an object distance down to 0.85 meter. A second lens unit G2 is a variator for zooming having a negative refractive power. The second lens unit G2 is moved along the optical axis toward the image plane to perform zooming from the wide angle end to the telephoto end. A third lens unit G3 is a variator for zooming having a negative refractive power. During zooming from the wide angle end to the telephoto end, the third lens unit G3 is moved along the optical axis toward the image plane. A fourth lens unit G4 is a compensator having a negative refractive power. During zooming, the fourth lens unit moves along the optical axis nonlinearly to correct image plane variation with zooming. While the lens unit used to correct image plane variation is the fourth lens unit in this embodiment, the third lens unit may serve as a unit for correcting image plane variation. The zoom lens also includes a stop SP and a fifth lens unit G5, which is a relay unit (or rear unit) having a positive refractive power having the function of imaging. A focal length convertor or the like may be provided in an air gap inside the fifth lens unit G5. FIGS. 3A and 3B also show a glass block P, which may include a color separation prism and/or optical filter etc., and an image pickup surface I.

Values associated with the above-described conditional expressions in this embodiment will be presented in Table 1. This numerical embodiment satisfies all the conditional expressions. Thus, the zoom lens according to this numerical embodiment has excellent optical performance and is small in size and light in weight while having a wide angle of view with a focal length of 8.0 mm at the wide angle end and a high zoom ratio of 22.0.

(Numerical Embodiment 4)
Lengths in the following table are in millimeters.

| SN | r | d | nd | vd | θgF | ED | FL |
|---|---|---|---|---|---|---|---|
| 1 | −246.95878 | 2.30000 | 1.720467 | 34.70 | 0.5834 | 85.084 | −202.766 |
| 2 | 365.11209 | 2.51416 | 1.000000 | | | 82.508 | |
| 3 | 822.84941 | 2.30000 | 1.800999 | 34.97 | 0.5863 | 82.104 | −109.413 |
| 4 | 79.58878 | 17.30219 | 1.496999 | 81.54 | 0.5374 | 79.557 | 111.569 |
| 5 | −171.24940 | 0.40000 | 1.000000 | | | 79.552 | |
| 6 | 122.38451 | 4.44600 | 1.496999 | 81.54 | 0.5374 | 77.414 | 498.667 |
| 7 | 238.17588 | 6.83742 | 1.000000 | | | 77.017 | |
| 8 | 272.19851 | 4.44609 | 1.496999 | 81.54 | 0.5374 | 76.900 | 496.960 |
| 9 | −2738.63906 | 0.15000 | 1.000000 | | | 76.480 | |
| 10 | 117.94768 | 9.77635 | 1.618000 | 63.33 | 0.5441 | 73.821 | 135.512 |
| 11 | −283.31209 | 0.15000 | 1.000000 | | | 73.087 | |
| 12 | 61.93147 | 5.56759 | 1.000000 | 54.50 | 0.5550 | 65.670 | 173.051 |

-continued (Numerical Embodiment 4)
Lengths in the following table are in millimeters.

| | | | | | | | |
|---|---|---|---|---|---|---|---|
| 13 | 111.18673 | (variable) | 1.000000 | | | 64.860 | |
| 14 | 68.32573 | 0.90000 | 1.882997 | 40.76 | 0.5667 | 26.778 | −20.615 |
| 15 | 14.37758 | (variable) | 1.000000 | | | 21.345 | |
| 16 | −82.26801 | 6.63806 | 1.808095 | 22.76 | 0.6307 | 20.717 | 19.995 |
| 17 | −14.11570 | 0.70000 | 1.882997 | 40.76 | 0.5667 | 20.076 | −12.243 |
| 18 | 43.44559 | 0.20000 | 1.000000 | | | 19.430 | |
| 19 | 25.58514 | 2.96554 | 1.666800 | 33.05 | 0.5957 | 19.607 | 55.939 |
| 20 | 80.42132 | (variable) | 1.000000 | | | 19.232 | |
| 21 | −27.64338 | 0.70000 | 1.756998 | 47.82 | 0.5566 | 18.085 | −21.092 |
| 22 | 38.66434 | 2.78261 | 1.846490 | 23.90 | 0.6217 | 19.567 | 46.480 |
| 23 | 1390.62825 | (variable) | 1.000000 | | | 20.154 | |
| 24 | 0.00000 | 1.30000 | 1.000000 | | | 25.498 | |
| 25 | −212.38191 | 4.21898 | 1.638539 | 55.38 | 0.5485 | 26.162 | 54.482 |
| 26 | −30.23579 | 0.15000 | 1.000000 | | | 26.879 | |
| 27 | −197.58076 | 2.29520 | 1.516330 | 64.14 | 0.5352 | 27.400 | 451.130 |
| 28 | −107.50928 | 0.15000 | 1.000000 | | | 27.717 | |
| 29 | 50.21298 | 7.62533 | 1.517417 | 52.43 | 0.5564 | 28.090 | 36.712 |
| 30 | −29.17906 | 0.90000 | 1.834807 | 42.71 | 0.5642 | 27.844 | −42.615 |
| 31 | −160.52965 | 32.40000 | 1.000000 | | | 28.190 | |
| 32 | 74.67801 | 4.99521 | 1.496999 | 81.54 | 0.5374 | 28.865 | 60.663 |
| 33 | −49.68199 | 5.21107 | 1.000000 | | | 28.693 | |
| 34 | 1128.69269 | 1.40000 | 1.834030 | 37.20 | 0.5775 | 25.320 | −26.254 |
| 35 | 21.60174 | 5.63348 | 1.487490 | 70.23 | 0.5300 | 24.493 | 51.379 |
| 36 | 140.61898 | 0.17137 | 1.000000 | | | 24.778 | |
| 37 | 45.52921 | 7.85568 | 1.501270 | 56.50 | 0.5536 | 25.152 | 30.496 |
| 38 | −21.82173 | 1.40000 | 1.834807 | 42.71 | 0.5642 | 25.113 | −31.169 |
| 39 | −135.30754 | 0.14971 | 1.000000 | | | 26.217 | |
| 40 | 67.85055 | 5.68360 | 1.501270 | 56.50 | 0.5536 | 26.779 | 47.436 |
| 41 | −35.81190 | 4.00000 | 1.000000 | | | 26.845 | |
| 42 | 0.00000 | 33.00000 | 1.606590 | 46.44 | 0.5664 | 40.000 | |
| 43 | 0.00000 | 13.20000 | 1.516330 | 64.14 | 0.5352 | 40.000 | |
| 44 | 0.00000 | 0.00000 | 1.000000 | | | 40.000 | |

SN: surface number
ED: effective diameter
FL: focal length.

Various Data
zoom ratio 22.00

| | wide angle | intermediate | telephoto |
|---|---|---|---|
| focal length | 8.00 | 37.46 | 176.00 |
| F-number | 1.90 | 1.90 | 2.80 |
| angle of field | 34.51 | 8.35 | 1.79 |
| image height | 5.50 | 5.50 | 5.50 |
| overall lens length | 277.01 | 277.01 | 277.01 |
| BF | 7.48 | 7.48 | 7.48 |
| d13 | 0.80 | 37.72 | 51.73 |
| d15 | 6.42 | 6.19 | 9.26 |
| d20 | 52.24 | 10.72 | 4.17 |
| d23 | 7.25 | 12.08 | 1.55 |
| d44 | 7.48 | 7.48 | 7.48 |
| entrance P | 51.80 | 199.40 | 620.94 |
| exit p | 345.25 | 345.25 | 345.25 |
| front pp | 59.99 | 241.01 | 888.65 |
| rear pp | −0.52 | −29.98 | −168.52 | entrance p: entrance pupil position
exit p: exit pupil position
front pp: front principal point position
rear pp: rear principal point position point Zoom Lens Unit Data

| unit | LS | FL | LUL | front pp | rear pp |
|---|---|---|---|---|---|
| 1 | 1 | 68.00 | 56.19 | 35.32 | 1.76 |
| 2 | 14 | −20.73 | 0.90 | 0.61 | 0.13 |
| 3 | 16 | −61.72 | 10.50 | 2.08 | −3.81 |

-continued (Numerical Embodiment 4)
Lengths in the following table are in millimeters.

| 4 | 21 | −38.94 | 3.48 | 0.01 | −1.89 |
| 5 | 24 | 57.66 | 131.74 | 65.68 | −126.94 |

LS: leading surface of the unit
FL: focal length
LUL: lens unit length
front pp: front principal point position
rear pp: rear principal point position

TABLE 1 values associated with conditional expressions in
numerical embodiments (NE) 1 to 4

| condition | term | NE 1 | NE 2 | NE 3 | NE 4 |
|---|---|---|---|---|---|
| (1) | θp + 0.002 × vp | 0.6555 | 0.6630 | 0.6630 | 0.6640 |
| (2) | vp | 49.00 | 45.50 | 45.50 | 54.50 |
| (3) | Np + 0.01 × vp | 2.220 | 2.245 | 2.245 | 2.315 |
| (4) | Np | 1.73 | 1.79 | 1.79 | 1.77 |
| (5) | \|fp/f1\| | 2.64 | 2.15 | 2.50 | 2.54 |
| (14) | vp2 | 63.33 | 74.70 | 68.00 | 63.33 |
| (15) | Np2 + 0.01 × vp2 | 2.251 | 2.285 | 2.320 | 2.251 |
| (16) | Np2 | 1.62 | 1.54 | 1.64 | 1.62 |
| (17) | \|fp2/f1\| | 1.93 | 2.00 | 1.75 | 2.00 |
| (18) | vp_av | 72.24 | 74.21 | 64.34 | 72.49 |
| (19) | \|fp3/f1\| | 1.60 | 1.88 | 1.80 | 1.65 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, the zoom lens of the first and third embodiments includes, in order from the object side to the image side, a first lens unit having a positive refractive power, a second lens unit having a negative refractive power, a third lens unit having a negative refractive power, and a fourth lens unit having a positive refractive power. The zoom lens of the second and fourth embodiments includes, in order from the object side to the image side, a first lens unit having a positive refractive power, a second lens unit having a negative refractive power, a third lens unit having a negative refractive power, a fourth lens unit having a positive refractive power, and a fifth lens unit having a positive refractive power. However, the present invention is not limited to the zoom lens having such refractive power arrangements. The first, second, third, and fourth lens units in the first and third embodiments may have positive, negative, negative and positive refractive powers, respectively. The first, second, third, fourth and fifth lens units in the second and fourth embodiments may have positive, negative, positive, positive and positive refractive powers, respectively.

This application claims the benefit of Japanese Patent Application No. 2014-027235, filed Feb. 17, 2014, which is hereby incorporated by reference herein in its entirety.

What is claimed is:

1. A zoom lens comprising, in order from the object side to the image side:
a first lens unit having a positive refractive power which does not move for zooming;
a plurality of lens units which move during zooming; and
a rear lens unit having a positive refractive power which does not move for zooming;
wherein the zoom lens satisfies the following conditions:

$0.6545 < \theta p + 0.002 \times vp < 0.6660$, $43.0 < vp < 57.0$, $2.210 < Np + 0.01 \times vp < 2.320$, $1.72 < Np < 1.80$, and $2.10 < |fp/f1| < 2.70$, where Np, vp, and θp are the refractive index, the Abbe constant and the partial dispersion ratio of the positive lens located closest to the image side among the positive lenses in the first lens unit respectively, fp is the focal length of the positive lens located closest to the image side among the positive lenses in the first lens unit, and f1 is the focal length of the first lens unit, the Abbe constant v and the partial dispersion ratio θ being defined as follows:

$v = (Nd-1)/(NF-NC)$, and $\theta = (Ng-NF)/(NF-NC)$, were Ng, NF, Nd, and NC are refractive indexes for the g-line, F-line, d-line, and C-line respectively.

2. The zoom lens according to claim 1, wherein the plurality of lens units include, in order from the object side to the image side, a second lens unit having a negative refractive power which moves during zooming and a third lens unit having a negative refractive power which moves during zooming.

3. The zoom lens according to claim 1, wherein the plurality of lens units include, in order from the object side to the image side, a second lens unit having a negative refractive power which moves during zooming, a third lens unit having a negative refractive power which moves during zooming, and a fourth lens unit which moves during zooming.

4. The zoom lens according to claim 1, wherein a positive lens located second closest to the image side among the positive lenses in the first lens unit satisfies the following conditions:

$61.0 < vp2 < 78.0$, $2.230 < Np2 + 0.01 \times vp2 < 2.330$, and $1.52 < Np2 < 1.65$, where Np2 and vp2 are the refractive index and the Abbe constant of a positive lens located second closest to the image side among the positive lenses in the first lens unit, respectively,
and the following condition is satisfied:

$1.70 < |fp2/f1| < 2.05$, where fp2 is the focal length of the positive lens located second closest to the image side among the positive lenses in the first lens unit.

5. The zoom lens according to claim 1, wherein the first lens unit includes, in order from the object side to the image side, a first sub lens unit which does not move and a second sub lens unit having a positive refractive power which moves during focusing, the second sub lens unit consisting of two positive lenses and the first sub lens unit consisting of at least three lenses, or the second sub lens unit consisting of three positive lenses and the first sub lens unit consisting of at least two lenses.

6. The zoom lens according to claim 1, wherein the following condition is satisfied:

$$60 < vp\_av < 75,$$

where vp_av is the average of the Abbe constants of the positive lenses included in the first lens unit.

7. The zoom lens according to claim 1, wherein the following condition is satisfied:

$$1.55 < |fp3/f1 \oplus < 1.90,$$

where fp3 is the focal length of a positive lens located closest to the object side among the positive lenses in the first lens unit.

8. An image pickup apparatus having a zoom lens, the zoom lens comprising, in order from the object side to the image side:
a first lens unit having a positive refractive power which does not move for zooming;
a plurality of lens units which move during zooming; and
a rear lens unit having a positive refractive power which does not move for zooming;
wherein the zoom lens satisfies the following conditions:

$$0.6545 < \theta p + 0.002 \times vp < 0.6660,$$

$$43.0 < vp < 57.0,$$

$$2.210 < Np + 0.01 \times vp < 2.320,$$

$$1.72 < Np < 1.80, \text{ and}$$

$$2.10 < |fp/f1| < 2.70,$$

where Np, vp, and θp are the refractive index, the Abbe constant and the partial dispersion ratio of the positive lens located closest to the image side among the positive lenses in the first lens unit respectively, fp is the focal length of the positive lens located closest to the image side among the positive lenses in the first lens unit, and f1 is the focal length of the first lens unit, the Abbe constant ν and the partial dispersion ratio θ being defined as follows:

$$\nu = (Nd-1)/(NF-NC), \text{ and}$$

$$\theta = (Ng-NF)/(NF-NC),$$

where Ng, NF, Nd, and NC are refractive indexes for the g-line, F-line, d-line, and C-line respectively.

* * * * *